UNITED STATES PATENT OFFICE.

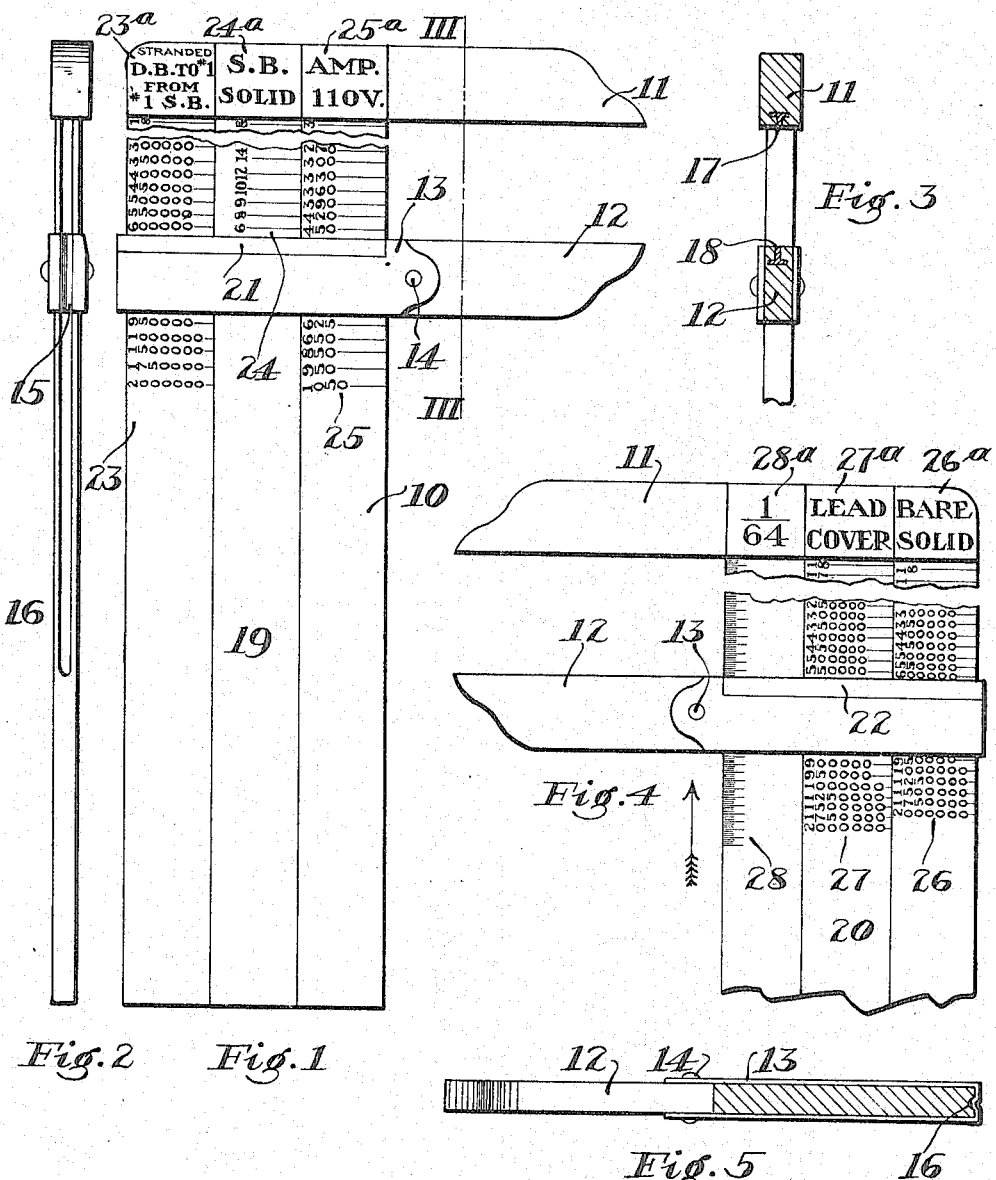

HOWARD GARDNER WILSON, OF CHICAGO, ILLINOIS.

GAGE.

1,129,937. Specification of Letters Patent. Patented Mar. 2, 1915.

Application filed March 28, 1910. Serial No. 551,894.

*To all whom it may concern:*

Be it known that I, HOWARD G. WILSON, a citizen of the United States, and resident of Chicago, in the county of Cook and State of Illinois, have invented certain new and useful Improvements in Gages, of which the following is a specification.

My present invention relates to gages, and more particularly to calipering gages, and contemplates the provision of an improved form of gage adapted for measuring the diameter in divisions of an inch, the dimensions according to special arbitrary standards, the numbers, and the carrying capacities of wires.

The principal objects of my present invention are the provision of an improved construction of gage which may be readily used in electrical inspection work, for ascertaining data concerning the wires in use, without danger of short-circuiting them; the provision of a gage of the character indicated which will not readily become worn in service, but which when so worn may be repaired with facility; the provision of a gage which will in use present the data most frequently required in electrical inspection work, without need for reference to a book of tables and comparison of one of such tables with one or more other such tables, together with certain further objects to be below disclosed.

In the attainment of the foregoing objects, as well as of certain additional advantages which will hereinafter appear, I have provided the construction illustrated in preferred form in the accompanying drawings wherein—

Figures 1 and 2 are respectively an elevational view, and a view of the edge thereof, of a gage embodying my improvements in preferred form; Fig. 3 is a sectional view taken on the line III—III of Fig. 1; Fig. 4 is an elevational view, similar to that of Fig. 1, of that side of the gage opposite to the one appearing in Fig. 1; and Fig. 5 is a view partly in section, of the under side of Fig. 4, showing the means of attaching the moving caliper leg to the body of the gage.

Referring now more particularly to Fig. 1 of the drawings, it will be observed that in carrying out my invention I make use of a main body portion or beam 10 upon which is mounted a fixed head 11 and upon which is movably carried a sliding caliper leg 12 supported in position by means of a plate 13 embracing the beam 10 and riveted as indicated at 14 to the leg 12. To prevent the member 13 from disengagement with the member 10, the same is provided as indicated at 15 with a depressed portion, forming a tongue adapted to ride in the groove 16 cut into the latter.

In order to avoid the making of short circuits where my improved gage is used in measuring live wires, it should preferably be made of electrical non-conductive material, such as hard fiber or wood, and for the purpose of preventing such wear thereof as would render the gage inaccurate, and therefore useless, I insert both in the head 11 and the leg 12, metallic wearing members 17 and 18 respectively (Fig. 3) here shown as of T cross-section.

In order that the reading of the figures carried upon the gage may be accomplished with the greatest ease, the member 13 is provided on both sides, 19 (Fig. 1) and 20 (Fig. 4) with beveled portions 21 and 22 respectively.

As will be observed on reference to Fig. 1 of the drawing, I have provided the surface 19 of the beam with a plurality of tables of information, each element of each table being disposed in alinement with the corresponding elements of the remaining tables on both of the sides 19 and 20 of the beam, in order that by reference to the data adjacent the beveled edges 21 and 22, all information applicable to the wire then embraced between the members 11 and 12 may be easily available.

It will be observed that on the face 19 of the beam I have shown at 23 the capacity in circular mills of stranded, double-braided wire, at 24 the arbitrary standard sizes of single-braided solid wire of like size, and at 25 the ampere capacities of such wires at 110 volts; and on reference to the face 20 of the beam that I have shown at 26 the capacity in circular mills of bare solid wire, at 27 the capacity in circular mills of lead-covered solid wire, and at 28 a subdivision of the beam into fractions of an inch, here shown as sixty-fourths.

At 23$^a$, 24$^a$, and 25$^a$ on the face 19 of the beam, and at 26$^a$, 27$^a$, and 28$^a$ of the face 20 of the beam, I have provided on the fixed head 11 suitable captions for the several scales above enumerated corresponding thereto.

Having thus described my invention and illustrated its use, what I claim as new and desire to secure by Letters Patent is the following:

1. A gage comprising a beam provided with a fixed head and a longitudinal groove extending from said fixed head and of less length than the beam, a plate embracing said beam and extending beyond one edge thereof and having means coöperating with said groove and engageable with the end wall of said groove farthest from the fixed head and a caliper leg secured at one end in the projecting end of said plate.

2. A gage comprising a beam provided with a fixed head, a plate embracing said beam and extending beyond one edge thereof, and a caliper leg secured at one end in the projecting ends of said plate, said beam having a longitudinal groove in its outer edge extending from said fixed head and terminating at a distance from the opposite end of said beam, and said plate having a depressed portion forming a tongue slidable in said groove.

In testimony whereof I have hereunder signed my name in the presence of the two subscribed witnesses.

HOWARD GARDNER WILSON.

Witnesses:
PAUL CARPENTER,
F. F. MALTBY.